Patented June 10, 1952

2,600,180

UNITED STATES PATENT OFFICE 2,600,180

SOLUTIONS OF POLYMERS OF VINYLIDENE CYANIDE

Alan E. Ardis, Cuyahoga Falls, Ohio, assignor to The B. F. Goodrich Company, New York, N. Y., a corporation of New York No Drawing. Application June 3, 1950, Serial No. 166,078

12 Claims. (Cl. 260—32.6)

This invention relates to novel polymer solutions, and pertains more particularly to solutions of polyvinylidene cyanide and copolymers and interpolymers of vinylidene cyanide with other polymerizable materials, which solutions are very useful in the preparation of synthetic filaments and films.

A copending application, Serial No. 11,336, filed February 26, 1948, now U. S. Patent No. 2,589,294, describes methods for the preparation of highly useful polymers of vinylidene cyanide and discloses that polyvinylidene cyanide of high molecular weight, for example, in excess of 25,000 is capable of being used to form excellent synthetic fibers, films and filaments. It is also known that vinylidene cyanide copolymerizes with other polymerizable materials to form high molecular weight copolymers which are also useful for preparing synthetic filaments and films. However, only a very few solvents for these high molecular weight polymers and copolymers are known, they being insoluble in most all of the solvents ordinarily employed in dissolving high polymers and copolymers, including alcohols, carboxylic acids and their esters, ketones, hydrocarbons, chloro- and nitro-substituted hydrocarbons and the like.

Accordingly, it is an object of this invention to provide a new class of solvents for polymers of vinylidene cyanide, which solvents are suitable for forming polymer solutions from which excellent films, filaments and the like may be prepared.

It is another object of this invention to provide a new class of solvents for polymers of vinylidene cyanide, which solvents do not degrade or decompose the polymer, and which may be readily and completely removed from the filaments, films and the like prepared from such solutions. Other objects will be apparent hereinafter.

It has now been discovered that the above and other objects are readily attained by the use of disubstituted cyanamides as solvents for the polymers of vinylidene cyanide. Polymer solutions are thereby obtained which have the desired viscosity for the spinning of filaments and the casting of films. Moreover, the filaments and films prepared from such solutions possess many valuable properties including high tensile strength, low elongation and excellent resistance to the action of chemicals. The disubstituted cyanamides are especially valuable solvents since they are readily soluble in water, and do not hydrolyze readily.

The disubstituted cyanamides which are useful solvents for polymers of vinylidene cyanide possess the formula

wherein each R is an aliphatic hydrocarbon radical. More particularly it is desired that each R be a member of the class consisting of alkyl radicals containing from one to four carbon atoms and alkenyl radicals containing from two to six carbon atoms. Included within the class of disubstituted cyanamides which are useful solvents are dimethyl cyanamide, diethyl cyanamide, dipropyl cyanamide, diisopropyl cyanamide, dibutyl cyanamide, diamyl cyanamide, dihexyl cyanamide, as well as other dialkyl cyanamides; dialkenyl substituted cyanamides such as diallyl cyanamide, dimethallyl cyanamide, divinyl cyanamide, diisopropenyl cyanamide, di-2-ethallyl cyanamide, and the like, as well as disubstituted cyanamides in which the R's are different, for example, methylallyl cyanamide, ethylallyl cyanamide, propylmethallyl cyanamide, methylisopropenyl cyanamide, and the like. The especially preferred solvents are the dialkyl substituted cyanamides containing from one to four carbon atoms such as dimethyl cyanamide, diethyl cyanamide, dipropyl cyanamide, dibutyl cyanamide, and the like.

No special conditions or precautions are necessary in preparing the polymer solutions of this invention. For example, solutions may be prepared either by adding the polymer to the solvent or by reversing the order of addition. Solution of the polymer occurs at room temperature but is much more readily effected by heating the polymer-solvent mixture to a temperature of about 50° C. to 70° C. Solutions containing less than about 30%, and especially from about 8 to 20% by weight of polymer or copolymer are preferred for use as spinning or casting solutions.

It has been found desirable that the polymer solution be stabilized against possible polymer chain degradation, especially if they are to be kept for appreciable lengths of time before use. Suitable stabilizers include the oxides of sulfur, and especially sulfur dioxide, as well as organic acid anhydrides. The use of a stabilizer is not a critical expedient, however, for the solutions of vinylidene cyanide polymers and copolymers in disubstituted cyanamides remain relatively stable for a period of several days even when no stabilizing substance is present.

As was disclosed hereinabove, the disubstituted cyanamides are useful solvents not only for polyvinylidene cyanide but also for copolymers of vinylidene cyanide with other unsaturated polymerizable materials. Polymerizable materials which form excellent copolymers with vinylidene cyanide include, for example, vinyl esters of organic and inorganic acids such as vinyl acetate, vinyl butyrate, vinyl benzoate and vinyl chloride; acrylic and methacrylic acid esters such as methyl acrylate, ethyl acrylate and methyl methacrylate; allyl esters of organic and inorganic acids such as allyl acetate, allyl propionate, allyl chloride, allyl cyanide and methallyl chloride; olefinic and diolefinic compounds such as styrene and substituted styrenes, isobutylene, butadiene and substituted butadienes, as well as other polymerizable materials such as acrylonitrile and vinylidene chloride. The quantity of any monomer in the copolymer is not critical since it has been found that the disubstituted cyanamides will dissolve the copolymer regardless of the monomer charging ratios. The molecular weight of the polymers of vinylidene cyanide is likewise not critical, although as has been disclosed hereinabove the molecular weight should be in excess of 25,000 since lower molecular weight copolymers and polymers are of little practical value.

The preparation of polymer solutions in accordance with the present invention as well as the use of such solutions in the spinning of filaments and the casting of films is more fully described in the following examples wherein all parts are by weight.

*Example I*

1.0 part of high molecular weight polyvinylidene cyanide is intimately mixed with 10 parts of dimethyl cyanamide at room temperature whereupon a clear, sirupy, viscous solution is formed. This solution is suitable for use as a spinning solution.

When a vinylidene cyanide-vinyl acetate copolymer is substituted for polyvinylidene cyanide, the resulting solution is again clear and viscous and useful for the spinning of filaments and casting of films.

*Example II*

A spinning solution is prepared by dissolving 0.5 part of polyvinylidene cyanide of molecular weight considerably above 25,000 in 4.0 parts of diethyl cyanamide. The mixture is then heated to a temperature of about 70° C. whereupon a water-like solution having a viscosity suitable for spinning is formed. When this solution is spun into a suitable spinning bath a strong, lustrous filament is obtained.

*Example III*

Another solution is prepared by dissolving a high molecular weight vinylidene cyanide-vinyl acetate copolymer in diethyl cyanamide maintained at a temperature of about 70° C. This solution is then cast onto a polished metal surface to give a clear, tough film.

*Example IV*

Example III is repeated except that diallyl cyanamide and diisopropyl cyanamide are substituted for diethyl cyanamide. In each case a clear sirupy viscous solution suitable for spinning and casting is again obtained.

When the above examples are repeated using other disubstituted cyanamides, for example, dibutyl cyanamide, dimethallyl cyanamide or methylethyl cyanamide, the solutions obtained are in general equivalent to the solutions of the examples.

Also, the disubstituted cyanamides of the present invention may be utilized in admixture with other solvents such as acetone or methylethyl ketone, which in themselves are not solvents for polymers of vinylidene cyanide, but which together with disubstituted cyanamides in amount as little as 20% by volume or even less form excellent solvent mixtures. For example, a mixture of 50 parts of dimethyl cyanamide and 50 parts of acetone readily dissolves both polyvinylidene cyanide and copolymers of vinylidene cyanide with any of the polymerizable materials disclosed hereinabove.

Although specific examples of the invention have been described herein, it is not intended to limit the invention thereto, for numerous modifications will be apparent to those skilled in the art and are included within the scope of the appended claims.

I claim:

1. A solution of a polymer of vinylidene cyanide in a solvent comprising a compound of the formula

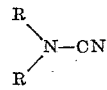

wherein each R is an aliphatic hydrocarbon radical.

2. A solution of a polymer of vinylidene cyanide, in a solvent comprising a compound of the formula

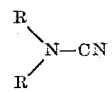

wherein each R is a member of the class consisting of alkyl radicals containing from one to four carbon atoms and alkenyl radicals containing from two to six carbon atoms.

3. A solution of a polymer of vinylidene cyanide, said polymer possessing a molecular weight in excess of 25,000, in a compound of the formula

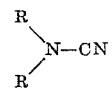

wherein each R is a member of the class consisting of alkyl radicals containing from one to four carbon atoms and alkenyl radicals containing from two to six carbon atoms.

4. A solution of a polymer of vinylidene cyanide, said polymer possessing a molecular weight in excess of 25,000, in a dialkyl cyanamide, in which each alkyl radical contains from one to four carbon atoms.

5. A solution of a polymer of vinylidene cyanide, said polymer possessing a molecular weight in excess of 25,000, in a dialkenyl cyanamide, in which each alkenyl radical contains from two to six carbon atoms.

6. A solution suitable for the spinning of filaments and the casting of films, said solution comprising from 8 to 20% by weight of a polymer of vinylidene cyanide, said polymer possessing a molecular weight in excess of 25,000, dissolved in a compound of the formula

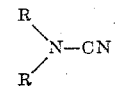

wherein each R is a member of the class consisting of alkyl radicals containing from one to four carbon atoms and alkenyl radicals containing from two to six carbon atoms.

7. A solution of a polymer of vinylidene cyanide in dimethyl cyanamide.

8. A solution of a polymer of vinylidene cyanide in diethyl cyanamide.

9. A solution of a polymer of vinylidene cyanide in diallyl cyanamide.

10. A solution suitable for the spinning of filaments and casting of films, said solution comprising from 8 to 20% by weight of a vinylidene cyanide-vinyl acetate copolymer dissolved in dimethyl cyanamide.

11. A solution suitable for the spinning of filaments and the casting of films, said solution comprising from 8 to 20% by weight of a vinylidene cyanide-vinyl acetate copolymer dissolved in diethyl cyanamide.

12. A solution suitable for the spinning of filaments and the casting of films, said solution comprising from 8 to 20% by weight of a vinylidene cyanide-vinyl acetate copolymer dissolved in diallyl cyanamide.

ALAN E. ARDIS.

REFERENCES CITED

The following references are of record in the file of this patent:

UNITED STATES PATENTS

| Number | Name | Date |
|---|---|---|
| 2,466,395 | Dickey | Apr. 5, 1949 |

FOREIGN PATENTS

| Number | Country | Date |
|---|---|---|
| 895,600 | France | Jan. 29, 1945 |